United States Patent
Matzel et al.

(10) Patent No.: US 9,055,737 B2
(45) Date of Patent: Jun. 16, 2015

(54) METHOD AND APPARATUS FOR DETERRING NUISANCE ANIMALS

(75) Inventors: Gregory Matzel, Colts Neck, NJ (US); Karen Sue Matzel, Colts Neck, NJ (US)

(73) Assignee: Scare Dogs, LLC, Colts Neck, NJ (US)

( * ) Notice: Subject to any disclaimer, the term of this patent is extended or adjusted under 35 U.S.C. 154(b) by 0 days.

(21) Appl. No.: 13/612,335

(22) Filed: Sep. 12, 2012

(65) Prior Publication Data

US 2013/0061817 A1 Mar. 14, 2013

Related U.S. Application Data

(60) Provisional application No. 61/534,161, filed on Sep. 13, 2011.

(51) Int. Cl.
*A01M 31/06* (2006.01)
*A01M 29/00* (2011.01)
*A01M 29/06* (2011.01)

(52) U.S. Cl.
CPC ..................... *A01M 29/06* (2013.01)

(58) Field of Classification Search
CPC .............................. A01M 29/00; A01M 31/06
USPC .................. 43/1, 2, 3; 40/411, 412, 417, 420; 116/22 A
See application file for complete search history.

(56) References Cited

U.S. PATENT DOCUMENTS

| | | | | |
|---|---|---|---|---|
| 364,573 A * | 6/1887 | Brinkop | .............................. | 43/3 |
| 957,750 A * | 5/1910 | Cunningham | ..................... | 43/3 |
| 3,735,514 A * | 5/1973 | Asder | .............................. | 40/412 |
| 5,459,958 A * | 10/1995 | Reinke | ................. | 43/2 |
| 5,515,637 A * | 5/1996 | Johnson | ............................. | 43/2 |
| 6,092,322 A * | 7/2000 | Samaras | ........................... | 43/2 |
| 6,266,912 B1 * | 7/2001 | Jirele | ................. | 43/2 |
| 6,532,693 B2 * | 3/2003 | Sides | ................. | 43/2 |
| 6,658,782 B2 * | 12/2003 | Brint | ................. | 43/2 |
| 6,901,693 B1 * | 6/2005 | Crowe | ................. | 43/2 |
| 7,562,487 B2 * | 7/2009 | Barr | ........................ | 43/2 |
| 7,694,451 B1 * | 4/2010 | Zink, Jr. | ............................. | 43/3 |
| 7,966,963 B1 * | 6/2011 | Caldwell et al. | ............ | 116/22 A |
| 8,627,592 B2 * | 1/2014 | Sloop | ................. | 43/2 |
| 2007/0221115 A1 * | 9/2007 | Pollard et al. | ............... | 116/22 A |
| 2008/0210153 A1 * | 9/2008 | Alvarado | .................... | 116/22 A |
| 2009/0007479 A1 * | 1/2009 | Jerome, Sr. | ........................ | 43/2 |
| 2009/0249678 A1 * | 10/2009 | Arnold | ............................. | 43/2 |
| 2010/0064569 A1 * | 3/2010 | Wyant | ................. | 43/2 |
| 2010/0180486 A1 * | 7/2010 | Jaeger | ................. | 43/3 |
| 2011/0138662 A1 * | 6/2011 | Banman | ......................... | 40/411 |
| 2012/0240447 A1 * | 9/2012 | Gurner, III | ........................ | 43/2 |

\* cited by examiner

*Primary Examiner* — Monica Williams
*Assistant Examiner* — Michael Wang
(74) *Attorney, Agent, or Firm* — Wall & Tong LLP; Diana J. Rea

(57) ABSTRACT

A life like three-dimensional version of a predatory animal, used to scare off nuisance animals, is disclosed. A three-dimensional animal unit is mounted to a mounting unit which allows for installation in any type of pervious or non-pervious surface. A joint mounting system penetrates through a body cavity of the animal unit which allows for the animal unit to move with minimal air breezes, mimicking real life movement.

15 Claims, 7 Drawing Sheets

US 9,055,737 B2

METHOD AND APPARATUS FOR DETERRING NUISANCE ANIMALS

CROSS REFERENCE TO RELATED APPLICATIONS

This application claims the benefit of U.S. Provisional Patent Application Ser. No. 61/534,161, filed Sep. 13, 2011, which is herein incorporated by reference in its entirety.

FIELD OF THE INVENTION

The present disclosure relates to three-dimensional representations of predatory animals used to discourage nuisance animals.

BACKGROUND

Prior attempts to alleviate animal/wildlife nuisances include two-dimensional silhouettes. However, such devices are often difficult to see in a particular profile and have limited deterrent effect.

SUMMARY

Embodiments of the present disclosure disclose life like three-dimensional versions of predatory animals, e.g., dogs, used to scare off nuisance animals. The units are mounted to a mounting unit, such as a metal stake, that allows for installation in any type of pervious or non-pervious surface. A joint mounting system penetrates through a body cavity of the predatory animal unit which allows for the predatory animal unit to move/rotate freely with minimal air breezes, mimicking real life movement. This also reduces wear and tear on the unit, extending the life expectancy of the units. In one embodiment, articulated parts allow for the movement of individual body parts by minimal air breezes, further enhancing life like movements, e.g., tail, legs, ears, collar, etc., and further enhancing visibility and effectiveness. In one embodiment, a multi-functional mounting system allows for interchangeability of predatory animal units to allow for changing needs/seasonality, giving the ability to swap animals as required for maximum effectiveness.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
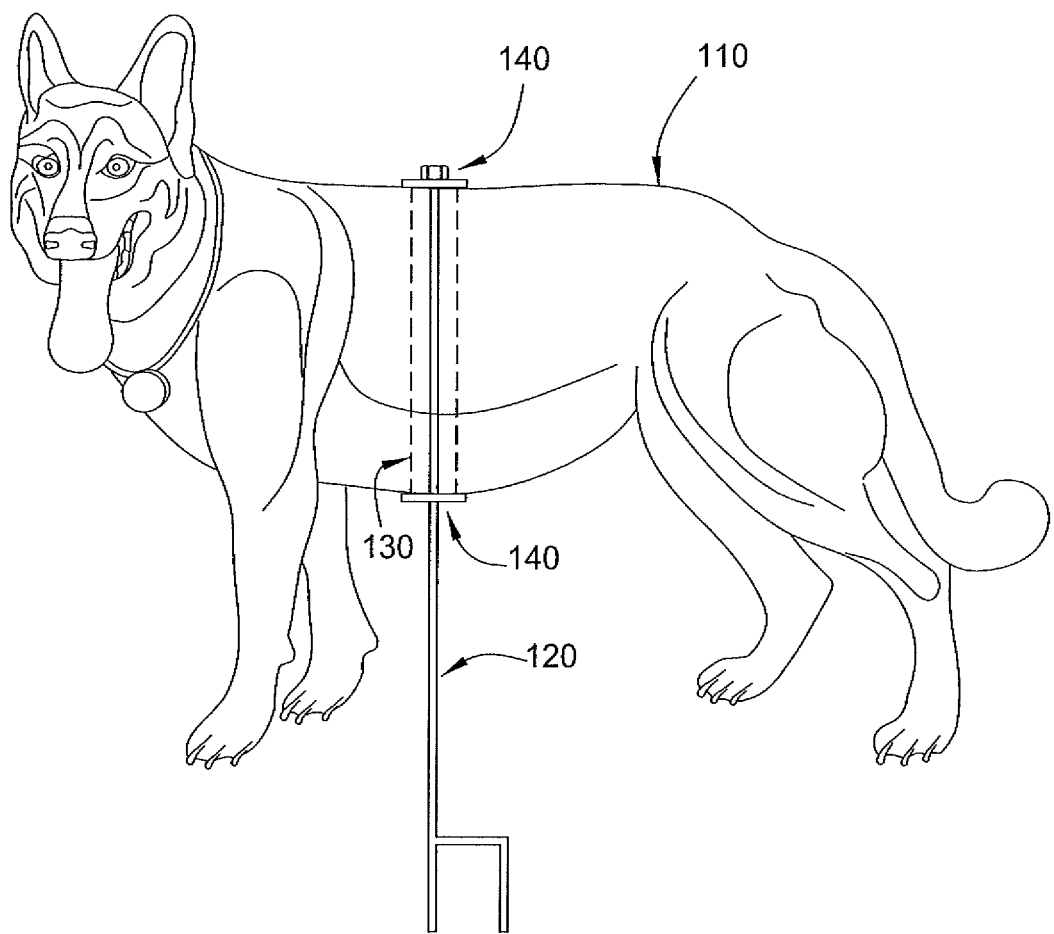
FIG. 1 illustrates an exemplary scare animal apparatus in accordance with various embodiments of the present disclosure.

Embodiments of the present disclosure disclose life like three-dimensional versions of predatory animals, e.g., dogs, (broadly, an animal) used to scare off nuisance animals. An exemplary apparatus comprises a three-dimensional animal unit mounted to a mounting unit, such as a metal stake, that allows for installation in any type of pervious or non-pervious surface. A joint mounting system penetrates through a body cavity of the animal unit which allows for the animal unit to move with minimal air breezes, mimicking real life movement. In one embodiment, articulated parts allow for the movement of individual body parts of the animal unit by air breezes further enhancing life like movements, e.g., tail, legs, ears, collar, etc., and further enhancing visibility and effectiveness. In one embodiment, animal units are molded in species-specific aggressive stances and postures, i.e., mouth open, ears and tail elevated for dog units and so on.

In one embodiment, a wind driven joint mounting system allows for free rotation of the animal unit, reducing air friction, which in turn reduces wear and tear on the animal unit. The free rotation and life like motions of the animal unit are enhanced by semi-articulated body parts, which allow for additional body movement in minimal air movement, further mimicking life like movements. In one embodiment, a multi-functional mounting system allows for interchangeability of animal units to allow for changing needs/seasonality, giving the ability to swap animals as required for maximum effectiveness.

Embodiments of the present disclosure can be used to scare off and deter multiple nuisance wild life animals, e.g., protect gardens from rabbits, and deer, protect garbage from raccoons and bears, protect ornamental ponds from egrets, herons, geese, and raccoons, protect chicken coops from foxes and coyotes, owls, hawks and vultures, guard open spaces to scare off geese and eliminate health hazards from geese excrement, protect ornamental shrubs and flower beds from grazing deer, and many other similar uses. In one embodiment, the animal units can be configured for night time use with the addition of glow in the dark collars, eyes and teeth. In one embodiment, solar powered motion sensitive night lights can also be added on the animal unit, on the mounting system, or any other location on the apparatus for additional night time deterrence.

Prior attempts to alleviate animal/wildlife nuisances include two-dimensional silhouettes. However, such devices are often difficult to see in a particular profile and have limited deterrent effect. Embodiments of the present disclosure provide a life like three-dimensional version of a real animal that is accurate from all views and remains visible regardless of the orientation of the apparatus and/or the orientation of the viewer (e.g., from the air as seen by a nuisance bird, such as Canadian geese, from the ground, as seen by a nuisance scavenger such as a raccoon). Additional advantages pertaining to embodiments of the present disclosure include:

Multiple animal units can be configured to scares multiple nuisance wild life animals, e.g., geese, deer, bears, coyotes, rabbits, ground hogs, squirrels, owls, hawks, raccoons, herons, and egrets, and numerous other animals;

Exemplary apparatuses are easy to install; the apparatuses may be constructed such that no tools are required for set up and installation;

A multi-faceted mounting system allows for both pervious and non-pervious surface installation and accommodates multiple unit types, allowing for units to be switched based on changing needs and seasonality, e.g., fall geese season set up with retrievers, winter deer grazing units changed to shepherds, etc.;

An easily moveable, non permanent installation system eliminates damage upon removal or relocation, no tools or digging required;

Multiple animal unit types may be made available based on nuisance animals to be scared off, e.g., German shepherds for deer and bears, retrievers for geese and other birds, alligators for herons, egrets, etc.;

Customizable: can be produced to a specific species/animal type, or custom logoed for parks departments, country clubs, homeowners' associations, etc.;

Can be accessorized for nighttime use with glow in the dark components.

Additional embodiments may also be configured to include reflective and/or glow in the dark accessories for night applications (e.g., eyes, teeth and collars on dogs, for scaring raccoons. Embodiments of the present disclosure may also include customized neck bandanas or collars, e.g., with a corporate or owner logo. In addition, various embodiments may include custom logos and screen printing on the animal unit (e.g., a country club logo for a golf course). Other embodiments may also include a motion sensitive solar powered night light (e.g., mounted on the animal unit, the mounting system, or any other location on the apparatus) for additional night time deterrence.

FIG. 1 illustrates an exemplary scare animal apparatus (broadly, an animal apparatus) in accordance with various embodiments of the present disclosure. For example, FIG. 1 illustrates an apparatus 100 comprising an animal body 110 in the form of a German shepherd, a mounting unit 120 (in one embodiment, the mounting unit is a mounting stake, as illustrated) which passes through an aperture 130 in the animal body 110, and a joint mounting system 140 which attaches the animal body to the mounting unit 120 in a moveable arrangement which allows the animal body 110 to swivel about the mounting unit 120.

Figure 2:
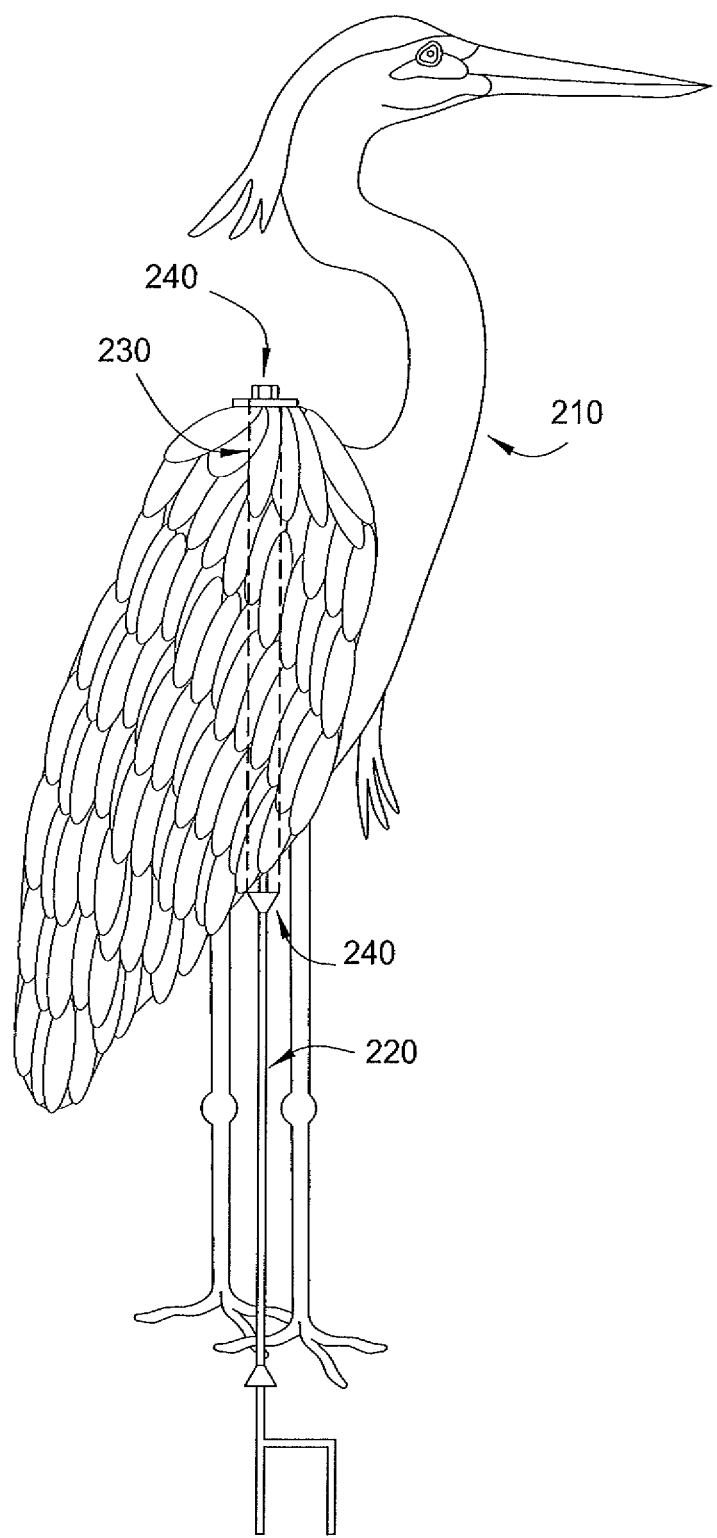
FIG. 2 illustrates another exemplary scare animal apparatus in accordance with various embodiments of the present disclosure in accordance with various embodiments.

FIG. 2 illustrates an exemplary scare animal apparatus in accordance with various embodiments of the present disclosure. For example, FIG. 2 illustrates an apparatus 200 comprising an animal body 210 in the form of a crane, a mounting unit 220 which passes through an aperture 230 in the animal body 210, and a joint mounting system 240 which attaches the animal body to the mounting unit 220 in a moveable arrangement which allows the animal body 210 to swivel about the mounting unit 220.

Figure 3:
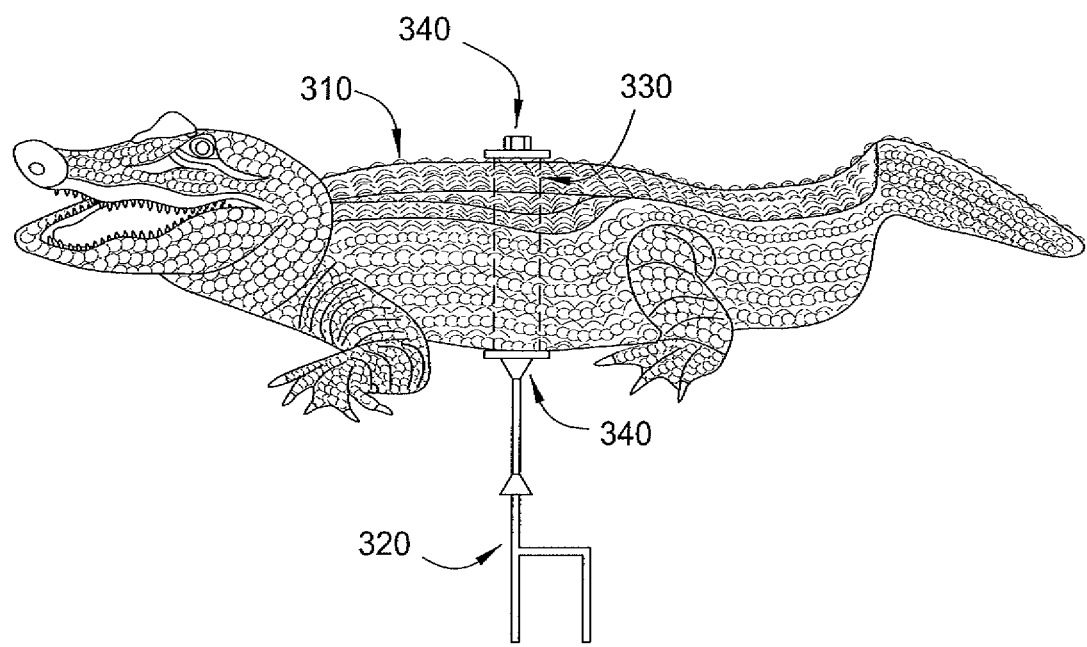
FIG. 3 illustrates still another exemplary scare animal apparatus in accordance with various embodiments of the present disclosure.

FIG. 3 illustrates an exemplary scare animal apparatus in accordance with various embodiments of the present disclosure. For example, FIG. 3 illustrates an apparatus 300 comprising an animal body 310 in the form of an alligator, a mounting unit 320 which passes through an aperture 330 in the animal body 310, and a joint mounting system 340 which attaches the animal body to the mounting unit 320 in a moveable arrangement which allows the animal body 310 to swivel about the mounting unit 320.

Figure 4:
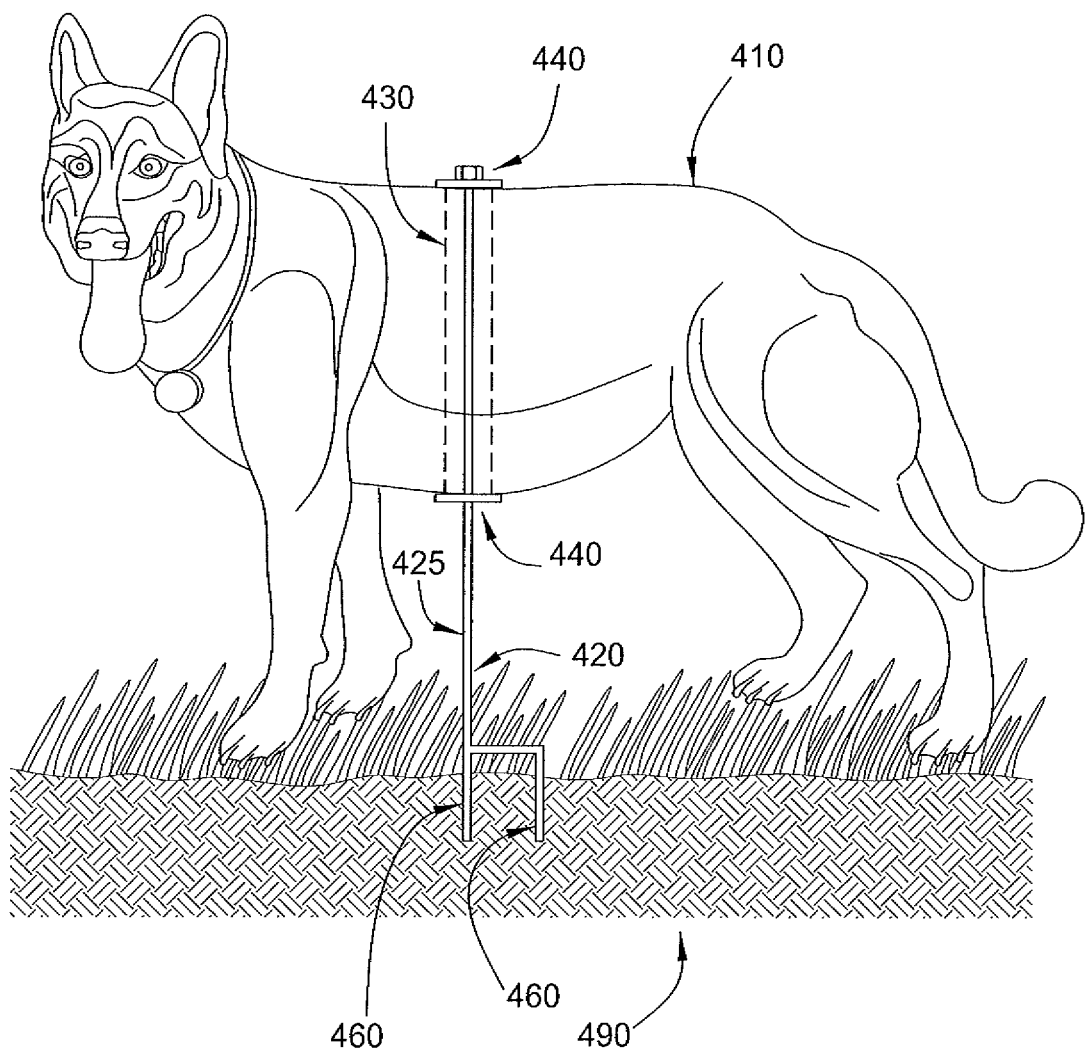
FIG. 4 illustrates an exemplary scare animal apparatus, as mounted in the ground, in accordance with various embodiments of the present disclosure.

FIG. 4 illustrates an exemplary scare animal apparatus in accordance with various embodiments of the present disclosure. For example, FIG. 4 illustrates an apparatus 400 comprising an animal body 410 in the form of a German shepherd, a mounting unit 420 which passes through an aperture 430 in the animal body 410, and a joint mounting system 440 which attaches the animal body to the mounting unit 420 in a moveable arrangement which allows the animal body 410 to swivel about the mounting unit 420. In one embodiment, the apparatus 400 comprises the same or substantially similar parts to those illustrated with respect to the apparatus 100 illustrated in FIG. 1. Mounting unit 420 comprises a mounting stake including a pair of spikes 460 at an end of the mounting unit 420 opposite to the animal body 410. When the apparatus 400 is deployed for use, the spikes are driven into the ground 490 in order to secure the apparatus in a position such that the animal body is in a substantially upright position.

Although, FIG. 4 illustrates a mounting unit 420 in the form of a mounting stake having only two spikes 460, other various further and different embodiments may include a mounting stake with more or less spikes (e.g., a single spike, four spikes, five spikes, etc.). In addition, although a mounting stake 420 including spikes 460 driven into the ground are illustrated in the example of FIG. 4, other various further and different embodiments may include other means of securing the apparatus in an upright position. For example, a mounting stake may include a platform base, or have legs which provide a stable base for a vertical portion (e.g., vertical portion 425, as shown in FIG. 4) of a mounting stake. An example of such a base is shown in the following FIG. 5. Similarly, although FIG. 4 illustrates an aperture 430 which extends through the entire animal body 410, in one embodiment, the aperture may include a closed end (e.g., at the top of the aperture) such that the mounting stake 420 and joint mounting system 440 extends through the animal body 410 only to the extent permitted by the size of the closed-ended aperture.

Figure 5:
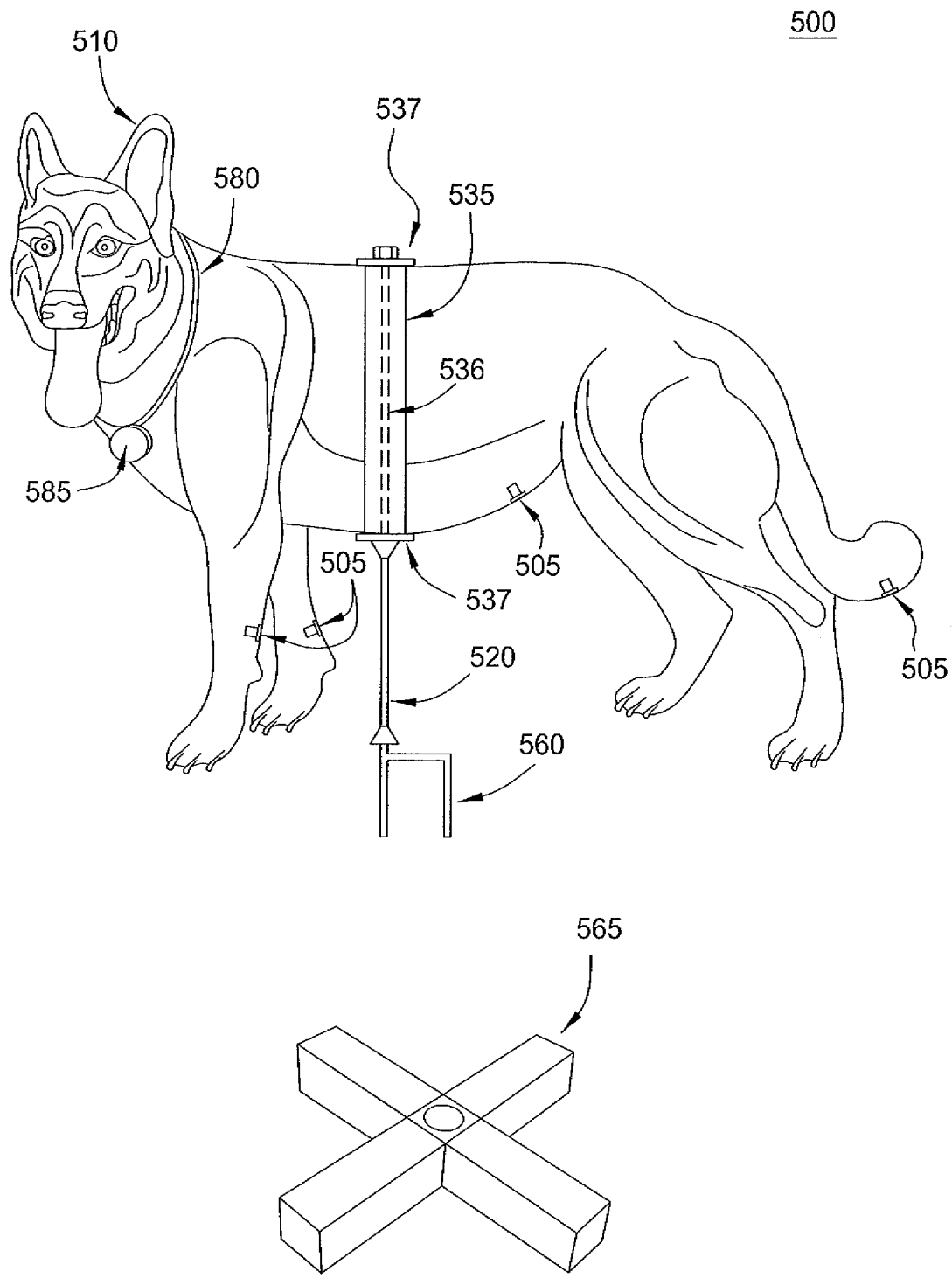
FIG. 5 illustrates an exemplary scare animal apparatus, with various features labeled for identification, in accordance with various embodiments of the present disclosure.

FIG. 5 illustrates an exemplary scare animal apparatus, with various features highlighted, in accordance with various embodiments of the present disclosure. For example, FIG. 5 illustrates an apparatus 500 comprising an animal body 510 in the form of a German shepherd, a mounting unit 520 which passes through an aperture in the animal body 510, and a joint mounting system 540 which attaches the animal body to the mounting unit 520 in a moveable arrangement which allows the animal body 510 to swivel about the mounting unit 520. In one embodiment, the apparatus 500 comprises the same or substantially similar parts to those illustrated with respect to the apparatuses 100 and/or 400 illustrated in FIGS. 1 and 4 respectively.

FIG. 5 further illustrates air inflation/deflation nipples 505. For example, the animal body 510 may include several cavities or compartments which are separately inflatable/deflatable via nipples 505. The apparatus 500 also includes an internal body cavity joint sleeve 535 which fits within an aperture/body cavity passing through the animal body 510. In one embodiment, the body cavity sleeve rod 536 is a cylinder, which is inserted into the body cavity joint sleeve 535 and provides coupling between the animal body 510 and the mounting unit 520. In one embodiment, the body cavity sleeve rod 536 is intended to be coupled with the body cavity joint sleeve 535. This also provides protection to the animal body 510. In particular, in one embodiment, the animal body 510 may comprise a flexible plastic or other material, such as vinyl, whereas the body cavity joint sleeve 535 may comprise a substantially rigid material such as PVC, other hard plastics, metals, composites, etc. The body cavity joint sleeve 535 surrounds the body cavity sleeve rod 536 and is coupled thereto by bushings 537. In various embodiments, the bushings 537 comprise plastic or rubber friction reducing bushings, ball bearing bushings, and the like. The bushings 537 provide a tight and smooth fit between the body cavity joint sleeve 535 and the body cavity sleeve rod 536, while at the same time permitting the former to move/swivel freely about the latter.

It should be noted that the body cavity sleeve rod 536 may comprise an extension of the mounting unit 520 (e.g., it is an integral component of the mounting unit) or may be fixed to the mounting unit by various means, such as internal/external threading on a tubular length which allows the body cavity sleeve rod 536 to be screwed together with the mounting unit 520. In one embodiment, the mounting unit 520 comprises a variable height extension rod. For example, the mounting unit 520 may comprise several tubular components mounted with or around the circumferences of each other. Various mechanisms may be employed to arrange the various tubular components to expand and retract the length of the mounting unit 520. For example, a variable height mounting unit may operate much like a painter's extension pole. It should be appreciated that various mechanisms are employed in customary extension devices (e.g., hydraulic extensions, electrical extensions, twist-lock extensions) which are all employed in various embodiments according to the present disclosure.

FIG. 5 further illustrates a pervious surface mounting system (e.g., spikes 560) for mounting the apparatus 500 in a pervious surface, such as grass, earth, sand, and the like. This arrangement may be the same as or substantially similar to that illustrated in FIG. 4 (e.g., spikes 460). However, FIG. 5 also illustrates an alternative mounting system comprising an impervious surface stand 565. The impervious surface stand 565 may replace spikes 560 when mounting the apparatus 500 on an impervious surface, such as pavement, asphalt, compacted soil, concrete, stone, pavers, and the like. In addition, FIG. 5 illustrates a collar 580 around a neck region of the animal body 510. In one embodiment, the collar may be a standard collar used for dogs, for example, or a representation of a collar molded to or formed integrally with the animal body 510. In some embodiments, the collar may be branded with a tag 585, such as with the owner's name, corporate name/logo/colors, a country club name, and various other customizable designs and configurations. This further enhances the life like nature of the animal body 510 while enhancing the marketability of the apparatus to intended users such as homeowners' associations, individuals, country clubs, and the like.

Figure 6:
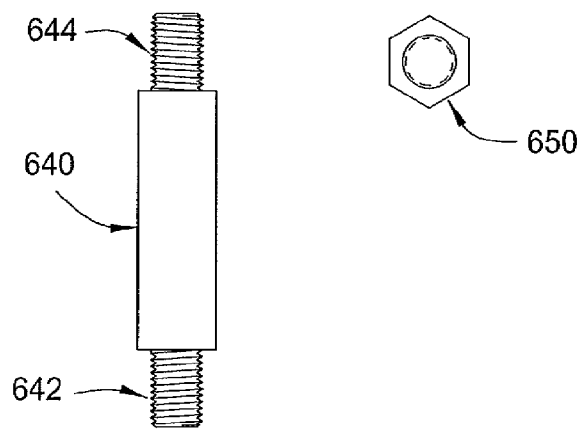
FIG. 6 illustrates features of an exemplary mounting unit, in accordance with various embodiments of the present disclosure.
Figure 6:
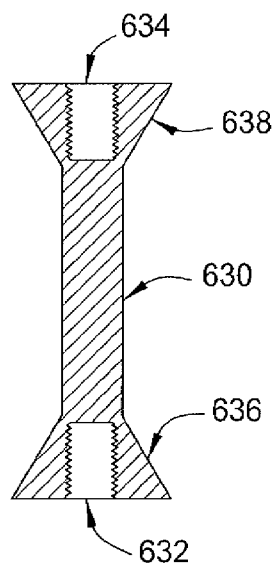
Figure 6:
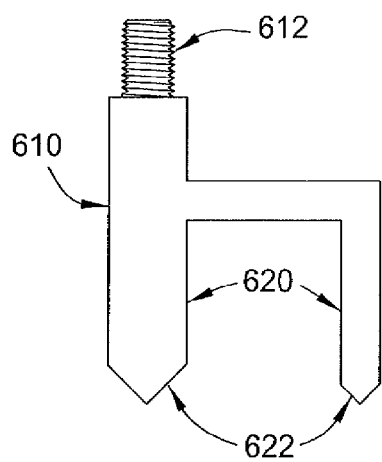

FIG. 6 illustrates features of an exemplary mounting unit 600, in accordance with various embodiments of the present disclosure. For example, mounting unit 600 may correspond to the various mounting units described above and illustrated in the respective FIGS. 1-5. As illustrated in FIG. 6, mounting unit 600 comprises a stake including a base portion 610 having mounting spikes 620 with pointed ends 622. In one embodiment a male threaded end 612 secures the base portion 610 to a main rod 630. The main rod comprises a tube of cylindrical, rectangular, or other geometric cross-section having a female threaded end 632 to secure the main rod 630 to the base portion 610 via the male threaded end 612. The main rod 630 also includes a second female threaded end 634 for securing the main rod 630 to a body cavity sleeve rod 640. In one embodiment, the main rod 630 further includes one or more flared ends 636, 638. In one embodiment, flared end 638, for example, provides a stable base for securing an animal body and/or a body cavity joint sleeve (not shown in FIG. 6). Body cavity sleeve rod 640 may be the same as or a substantially similar component to the body cavity sleeve rod 536 illustrated in FIG. 5. In one embodiment, body cavity sleeve rod 640 includes a male threaded end 642 for securing the main rod 630 to the body cavity sleeve rod 630 via female threaded end 634. Body cavity sleeve rod 640 is intended to pass through a body cavity joint sleeve (e.g., body cavity joint sleeve 535 in FIG. 5), an example of which is illustrated in greater detail in FIG. 7. In one embodiment, a female nut 650 (e.g., a wing nut, or other type) is affixed to a second male threaded end 644 on the body cavity sleeve rod 640. The female wing nut 650 is intended to secure an animal body and body cavity joint sleeve to the mounting unit 600.

As shown in FIG. 6, various exemplary dimensions of the components of the mounting unit 600 are indicated. For example, body cavity sleeve rod 640 is indicated as a ⅜" metal rod with a length varying based on a body cavity size. However, it should be understood that the dimensions provided in FIG. 6 are provided for illustrative purposes only. As such, in various embodiments of the present disclosure, various other dimensions of the several components are used. For example, body cavity sleeve rod 640 may comprise a square tube with ½' sides and may include ⅓" male threaded ends 642, 644. Similarly, although flared ends 636, 638 are indicated as having a ¾" end diameter, flared ends 636, 638 may in various embodiments provide a 1" end diameter, or any other configuration (e.g., that will provide a suitable base for an animal body and/or body cavity joint sleeve). Furthermore, although in FIG. 6 some components are indicated as having male or female threaded ends, it should be understood that in various other embodiments, the end-types may be reversed from part to part. In addition, in various embodiments other means of affixing the parts together may be used, e.g., pressure rings, glue, welding, etc., instead of, or in addition to, the threaded couplings shown in FIG. 6. In various embodiments, the mounting unit 600 may also comprise only two pieces, or a single molded piece. In short, various other configurations are possible in accordance with the present disclosure (in addition to those configurations which are explicitly described and depicted for illustrative purposes).

Figure 7:
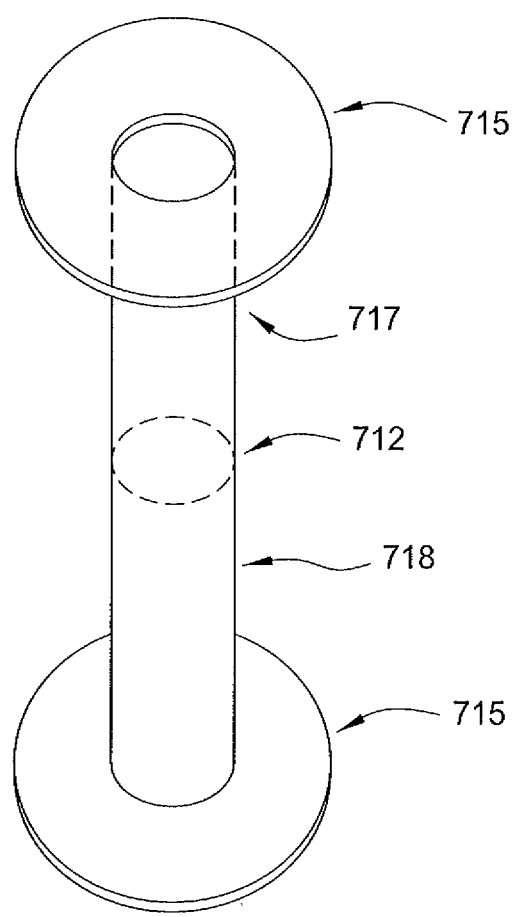
FIG. 7 illustrates features of another exemplary joint mounting system, in accordance with various embodiments of the present disclosure.
Figure 7:
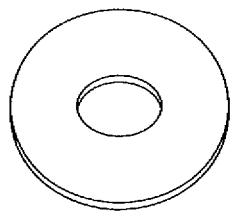

FIG. 7 illustrates a body cavity joint sleeve 710 and a friction reducing bushing 720 according to various embodiments of the present disclosure. Together, the body cavity joint sleeve 710 and the bushing 720 may be considered as a joint mounting assembly. As such, these components illustrated in FIG. 7 may comprise any one or more of the joint mounting assemblies illustrated in FIGS. 1-5 and discussed in connection therewith. As illustrated in FIG. 7, body cavity joint sleeve 710 may include a tubular portion 712 (which may be manufactured of plastic) and flared ends 715 which may comprise flanges of plastic or other material, or which may be formed in single piece with the tubular portion 712. The body cavity joint sleeve is intended to fit snugly within an exemplary animal body (e.g., as illustrated in any of FIGS. 1-5) and to be mounted surrounding a body cavity sleeve rod of a mounting unit (e.g., body cavity sleeve rod 640). In one embodiment, a bushing 720 (e.g., a plastic friction reducing bushing) is secured between main rod 630 and body cavity sleeve rod 640, providing a stable surface for one of the flared ends of the body cavity joint sleeve 710. The bushings 720 provide a tight and smooth fit between the body cavity joint sleeve 535 and the body cavity sleeve rod 536, while at the same time permitting the former to move/swivel freely about the latter. In one embodiment, the bushings 720 may comprise or include flanges which are oversized relative to the relevant tubes/rods to secure an animal body and/or body cavity joint sleeve 710 at the top and bottom (e.g., of a body cavity joint rod). In one embodiment, the body cavity joint sleeve may comprise two or more separate components 717, 718 which may be adjusted relative to one another in order to lengthen or shorten the body cavity joint sleeve. For example, component 717 may have a slightly larger or smaller diameter relative to component 718 such that one component may be slid over the other component. This allows a single body cavity joint sleeve 710 to be reused with different animal bodies which may have different aperture lengths.

It should be further noted that components of an exemplary apparatus may be manufactured from various suitable materials. For example, an animal body may be constructed of a flexible plastic material such as a vinyl, a hard plastic or other composite material. In one embodiment, the animal unit is inflatable using one or more nipples for moving air into a body cavity. An animal unit may have more than one cavity and thus plural nipples, e.g., one for each cavity, multiple nipples per cavity, etc. In one embodiment, the unit is constructed of a substantially rigid metal or plastic, such as PVC. In one embodiment, the joint mounting system comprises plastic, PVC and/or metal components.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus for deterring nuisance animals, comprising:
    a three-dimensional animal unit;
    a mounting unit; and
    a joint mounting assembly penetrating completely through a body cavity of the three-dimensional animal unit, wherein the joint mounting assembly attaches the three-dimensional animal unit to the mounting unit, wherein the joint mounting assembly allows the three-dimensional animal unit to rotate about the mounting unit, wherein the joint mounting assembly comprises a body cavity joint sleeve and a body cavity sleeve rod, wherein the body cavity joint sleeve is adjustable such that the body cavity joint sleeve is capable of being lengthened and shortened to accommodate a plurality of three-dimensional animal units having different body cavity lengths.

2. The apparatus of claim 1, wherein the body cavity comprises at least one aperture.

3. The apparatus of claim 1, wherein the mounting unit passes through the body cavity of the three-dimensional animal unit.

4. The apparatus of claim 1, wherein the mounting unit comprises:
    a mounting stake.

5. The apparatus of claim 1, wherein the body cavity sleeve rod is inserted in the body cavity joint sleeve for coupling the three-dimensional animal unit to the mounting unit.

6. The apparatus of claim 1, wherein the body cavity joint sleeve fits within the body cavity of the three-dimensional animal unit.

7. The apparatus of claim 1, wherein the body cavity joint sleeve comprises a rigid material comprising at least one of:
    polyvinyl chloride;
    a metal;
    a plastic; or
    a composite material.

8. The apparatus of claim 1, wherein the mounting unit comprises a main rod having at least one flared end for providing a base for the three-dimensional animal unit or the body cavity joint sleeve.

9. The apparatus of claim 1, wherein the body cavity joint sleeve comprises:
    at least one a tubular portion; and
    at least one flared end.

10. The apparatus of claim 1, wherein the three-dimensional animal unit comprises an inflatable flexible material.

11. The apparatus of claim 1, wherein the three-dimensional animal unit comprises a plurality of articulated body parts.

12. An interchangeable system for deterring nuisance animals comprising:
    at least one three-dimensional animal unit;
    a mounting unit; and
    a joint mounting assembly for penetrating completely through a body cavity of the at least one three-dimensional animal unit, wherein the joint mounting assembly is further for attaching the at least one three-dimensional animal unit to the mounting unit, wherein the joint mounting assembly allows the at least one three-dimensional animal unit to rotate about the mounting unit, and wherein the joint mounting assembly comprises a body cavity joint sleeve and a body cavity sleeve rod, wherein the body cavity joint sleeve is adjustable such that the body cavity joint sleeve is capable of being lengthened and shortened to accommodate a plurality of three-dimensional animal units having different body cavity lengths.

13. The interchangeable system of claim 12, wherein the body cavity joint sleeve comprises:
    at least one a tubular portion; and
    at least one flared end.

14. The interchangeable system of claim 12, wherein the at least one three-dimensional animal unit comprises the plurality of three-dimensional animal units, wherein at least one of the plurality of three-dimensional animal units comprises:
    a likeness of a dog.

15. The interchangeable system of claim 12, wherein the mounting unit comprises a plurality of interchangeable bases, wherein at least one of the plurality of interchangeable bases comprises:
    a mounting stake.

* * * * *